May 5, 1936.　　　M. WAGNER　　　2,039,671

WHEEL AXLE SUSPENSION

Filed Feb. 6, 1934

Inventor.
Max Wagner

Patented May 5, 1936

2,039,671

UNITED STATES PATENT OFFICE 2,039,671

WHEEL AXLE SUSPENSION

Max Wagner, Stuttgart, Germany, assignor to Daimler-Benz Aktiengesellschaft, Stuttgart-Unterturkheim, Germany, a company of Germany Application February 6, 1934, Serial No. 710,013
In Germany December 14, 1932

10 Claims. (Cl. 267—20)

My invention relates to an improved wheel axle suspension, particularly for motor-driven vehicles.

The objects of my invention which is primarily applicable to the suspension of the front wheels of automobiles are to provide an arrangement of improved simplicity and reliability; to eliminate frictional resistance within the spring assembly; to improve the riding qualities of the vehicle; to secure favorable conditions of the transmission of forces from the wheels to the frame and the steering gear; to eliminate any tendency of the wheels to shimmy; and to improve the steering gear.

Figure 1:
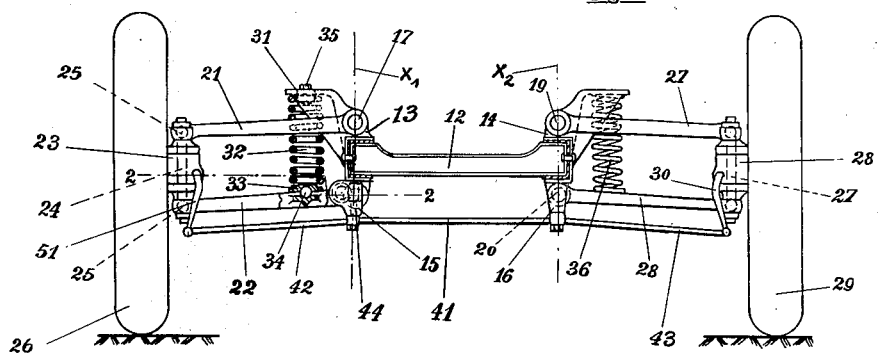
Figure 2:
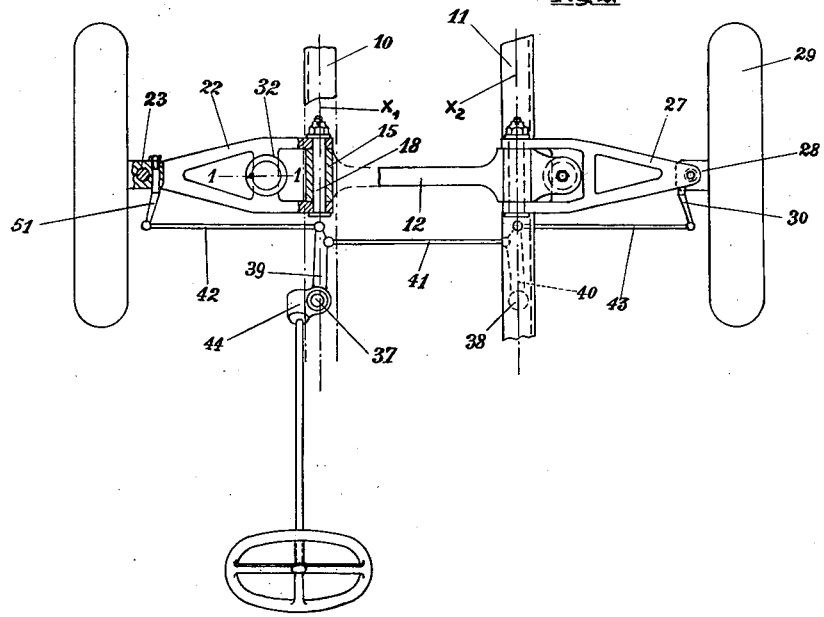

Further objects of my invention will appear from the description following hereinafter of some preferred embodiments which are illustrated in the drawing in which Fig. 1 is an elevation of my improved front wheel suspension partly in section along line 1—1 of Fig. 2;

Fig. 2 is a plan view of Fig. 1 partly in section along line 2—2 of Fig. 1.

The frame of the vehicle chassis which is partly illustrated in Figs. 1 and 2 comprises two longitudinally extending beams 10 and 11 which are rigidly connected near their front ends by a transverse member 12. Upper brackets 13 and 14 and lower brackets 15 and 16 are attached to the beams 10 and 11 adjacent to the transverse member 12 and are provided with borings accommodating trunnions 17, 18, 19 and 20 extending parallel to each other and in longitudinal direction. Fork-shaped links 21 and 22 have their diverging inner ends pivotally mounted on the projecting ends of the trunnions 17 and 18 while the outer ends are suitably pivotally connected to the upper and lower ends of a vertical king bolt on which the axle carrier 23 is freely rotatably mounted. While the pivotal connection of the king bolt 24 with the parallel links 21 and 22 is not shown in detail, it is to be understood that it is so designed as to permit a relative pivotal movement about axes extending parallel to the trunnions 17 and 18. Preferably, ball joints are provided for this purpose, as indicated at 25.

The axle carrier is formed with a stub axle carrying the front wheel 26 and is provided with a steering arm 51.

The other front wheel 29 is similarly suspended by means of parallel links 27 and 28 mounted on the trunnions 19 and 20 and pivotally connected by ball joints to a king bolt 27 journalled in the wheel carrier 28 carrying the wheel 29 and provided with a steering arm 30.

The distance between the ball joints 25 is substantially the same as that of the trunnions 17 and 18. Similarly, the links 21 and 22 are of substantially the same length and, therefore, form a parallelogram which will keep the wheel carrier 23 always substantially parallel to itself whereby the front wheels are prevented from tilting laterally when moving up and down relative to the chassis. This prevents a tilting of the wheels which is liable to produce undesirable reactionary gyroscopic forces adversely affecting the steering qualities.

The bracket 13 has an upward and outward extension forming an abutment 31 which bears against the upper end of an upright helical spring 32. This spring is arranged within the space between the arms of the forked link 21 and its lower end is supported on a disc 33 which in its turn is pivotally mounted by means of an interposed ball 34 on a transverse rib forming part of and connecting the arms of the lower link 22. The spring may be attached by suitable means such as a clamping plate and a bolt 35 to one or both of its supporting faces.

Attention is called to the fact that no means are provided for guiding the coils of the spring in the course of their movements and, hence, the spring is free from any frictional contact with the other elements of the structure.

A helical spring 36 is associated with the other wheel 29 in similar manner. For this purpose similar means are provided as described in connection with the spring 32 so that a detailed description thereof may be dispensed with.

It will appear from the foregoing description that the links which guide the wheels relative to the frame are mounted to swing about axes disposed in the vertical longitudinal planes $X_1$ and $X_2$, whereas the helical springs are arranged outside of these planes laterally of the frame beams 10 and 11.

I shall now proceed to describe the steering means.

Vertical pivot pins 37 and 38 are attached to the beams 10 and 11 extending downwardly from the lower faces of the same and arranged substantially within the planes $X_1$ and $X_2$. Forwardly extending arms 39 and 40 are mounted on these pins and their free ends are connected with each other by a link 41 and with the steering arms 51, or 30 respectively, by links 42 and 43, these links being so dimensioned that the free ends of the arms 39 and 40 are substantially located within the planes $X_1$ and $X_2$ when the steering gear is in normal position. The various joints connecting the arms 51, 30, 39 and 40 with the links 42 and 43 or 41 are constructed as ball joints.

One of the arms 39 and 40, for instance arm 39, is arranged to be directly actuated by the steering gear 44 which may be of the worm gear type and is provided with a steering shaft and steering wheel in the customary manner. If desired, the steering gear and the arms 39 and 40 may be directly mounted on the motor block.

It will be appreciated that this arrangement offers the advantage of permitting the alternative arrangement of the steering wheel on the left-hand side or on the right-hand side of the vehicle, as desired, since the steering gear may be alternatively associated either with arm 39 or with arm 40 depending on the requirements of the particular case.

The links 42 and 43 will always remain substantially parallel to the links 21 and 27 and will perform similar pivotal movements in operation. Therefore, the vertical pivotal movements of the links 21 and 27 will not result in a turn of the wheels about their king bolts and will not affect the steering operation.

Experience has shown, however, that a small departure from the true parallelism of the links 42, 43 with the links 21 and 27 does not effect the proper operation.

If the pivotal connection of the links 21 and 22 with the king bolt 24 is formed by ball joints as indicated at 25, the king bolt could be rigidly inserted in, or even be made integral with, the axle carrier 23 as will be easily understood. I prefer, however, to mount the carrier 23 on the king bolt 24 in the customary manner, loosely for free pivotal movement. The whole unit comprised of the axle carrier 23, the king bolt 24 and the steering arm 51 will be termed "wheel support" in the claims and I wish it to be understood that this term as used in the claims is to be broadly construed and is not limited to the alternative in which the king bolt is fast with the carrier 23.

It will appear from the foregoing description that I have provided improved means for independently suspending the wheels, preferably the front wheel, by means of pairs of links mounted for pivotal movement about axes extending longitudinally of the vehicle. The links will preferably guide the wheel in a substantially vertical path relative to the chassis and preferably helical springs are provided to resiliently transmit the weight of the vehicle to the wheels, these springs being free from any guiding means and, therefore, free from any frictional resistance. The entire assembly is compact and simple and requires a minimum of space. An extraordinary reliability in operation is secured by the simplicity of the structure and by the absence of springs which are subject to friction and would require lubrication. The use of helical springs which are subject to compressive forces only as distinguished from tension springs contributes considerably towards reliability. Another advantage of my invention resides in the practically complete absence of any friction in the spring mounting. Hence, no lubrication or other servicing of the springs is required. The riding qualities are excellent since the absence of any friction permits the springs to take up and absorb even the smallest shocks without transmitting them to the frame.

The provision of transversely oscillating links permits the links to be so arranged as to embrace the springs whereby a very compact arrangement may be attained. Moreover, this arrangement is particularly apt to reinforce the wheel mounting against transversely acting forces and shocks and to prevent unfavorable stresses to be set up in the frame and in the steering linkage. Preferably, the pairs of links guiding the wheels are so arranged as to form parallelograms which guide the wheels parallel to themselves in vertical direction.

My invention may be also applied to the mounting of the rear wheels of vehicles, but it offers particular advantages in its application to the front wheels because the guidance of the wheels parallel to themselves avoids adverse gyroscopic reactions which would be liable to adversely affect the steering qualities and to produce shimmy of the front wheels.

The pivotal connection of the pairs of links outside of the longitudinal central plane of the vehicle permits of providing an improved frame structure. The means for steering the wheels are simple in construction and effective in operation.

What I claim is:—

1. In a power driven vehicle the combination comprising a frame, a vehicle wheel, a wheel carrier, a pair of links for connecting the wheel carrier to the frame pivotally connected at one end to said frame one above the other so as to be capable of swinging only in a vertical plane about parallel axes fixed with respect to the frame but incapable of movement relatively to the frame in any other direction, said links being pivotally connected to the wheel carrier to form with the wheel carrier and the frame an articulated quadrilateral, and a frictionless helical compression spring interposed between one of said links and the frame so as to oppose the vertical swinging motion of the links, said spring being freely movable laterally substantially over its entire length and being secured against lateral displacement at its ends with respect to the frame and the link, respectively.

2. In a power driven vehicle, a longitudinal frame member, a vehicle wheel, a wheel carrier, an upper link pivotally mounted at one end directly on said frame member, so as to be capable of swinging only about an axis parallel to and above the frame member, and connected at the other end to the upper end of the wheel carrier, a lower link pivotally mounted at one end directly on the frame member, so as to be capable of swinging only about an axis parallel to and below the frame member, and connected at the other end to the lower end of the wheel carrier, a bearing bracket on the longitudinal frame member extending outwardly therefrom and a frictionless helical spring located on the outside of and in proximity to the longitudinal frame member, said spring bearing at one end against said bearing bracket and at the other end against the lower link so as to extend substantially vertically and being freely movable laterally substantially over its entire length and being secured against lateral displacement only at its upper end by the bearing bracket and at its lower end by the lower link.

3. In a power driven vehicle, the combination comprising a longitudinal frame member having upper and lower transverse flange members, a vehicle wheel, a wheel carrier, an upper link pivotally mounted at one end directly on and above the upper flange member so as to be capable of swinging relatively to the frame only in a vertical plane and pivotally connected at the other end to the wheel carrier, a bearing bracket on the upper flange member of the longitudinal frame member, said bearing bracket extending outwardly from the said flange member, a lower link pivotally mounted at one end directly on and below the lower flange member so as to be capable of swinging relatively to the frame only in a vertical plane and pivotally connected at the other end to the wheel carrier, and a helical spring interposed with its axis substantially vertical between the said bearing bracket and the lower link with one end of the spring abutting against the bracket and the other end against the link.

4. In a power driven vehicle, the combination as set forth in claim 3 in which the helical spring is freely movable laterally substantially over its entire length and is secured against lateral displacement only at its upper end by the bearing bracket and at its lower end by the lower link.

5. In a power driven vehicle, the combination comprising a longitudinal frame member having upper and lower transverse flange members, a vehicle wheel, a wheel carrier, an upper link pivotally mounted at one end directly on and above the upper flange member so as to be capable of swinging relatively to the frame only in a vertical plane and pivotally connected at the other end to the wheel carrier, a bearing bracket on the upper flange member of the longitudinal frame member, said bearing bracket extending outwardly from the said flange member, a lower link pivotally mounted at one end directly on and below the lower flange member so as to be capable of swinging relatively to the frame only in a vertical plane and pivotally connected at the other end to the wheel carrier, and a helical spring interposed with its axis substantially vertical between the said bearing bracket and the lower link with one end of the spring abutting against the bracket and the other end against the link, a second longitudinal frame member arranged on the opposite side of the longitudinal central plane of the vehicle to the first-mentioned frame member and a stiffening member between the longitudinal frame members rigidly connected to the first-mentioned frame member at the place thereof where the two links are pivotally mounted and the bearing bracket for the helical spring is located.

6. In a power driven vehicle, the combination comprising a longitudinal frame member having inwardly extending upper and lower transverse flange members, a vehicle wheel, a wheel carrier, an upper link pivotally mounted at one end directly on and above the upper flange member so as to be capable of swinging relatively to the frame only in a vertical plane and pivotally connected at the other end to the wheel carrier, a bearing bracket on the upper flange member of the longitudinal frame member, said bearing bracket extending outwardly from the said flange member, a lower link pivotally mounted at one end directly on and below the lower flange member so as to be capable of swinging relatively to the frame only in a vertical plane and pivotally connected at the other end to the wheel carrier, and a helical spring interposed with its axis substantially vertical between the said bearing bracket and the lower link with one end of the spring abutting against the bracket and the other end against the link, a second longitudinal frame member arranged on the opposite side of the longitudinal central plane of the vehicle to the first-mentioned frame member and a stiffening member between the longitudinal frame members, said stiffening member being inserted between the upper and lower transverse flange members and rigidly connected to the first-mentioned frame member at the place thereof where the two links are pivotally mounted and the bearing bracket for the helical spring is located.

7. In a power driven vehicle, the combination as set forth in claim 3 with a bearing member for the upper link on the longitudinal frame member and a bearing member for the lower link on the longitudinal frame member, said first-mentioned bearing member being integral with the bearing bracket for the helical spring.

8. In a power driven vehicle, a frame comprising two longitudinal frame members on opposite sides of the central longitudinal plane of the vehicle, a transverse stiffening member connecting the frame members together, a vehicle wheel, a wheel carrier, an upper link pivotally mounted at one end on the one frame member, so as to be capable of swinging relatively to the frame about a fixed longitudinal axis above said frame member, and pivotally connected at the other end to the wheel carrier, a lower link pivotally mounted at one end on the said frame member, so as to be capable of swinging relatively to the frame about a fixed longitudinal axis below said frame member, and pivotally connected at the other end to the wheel carrier, the said transverse stiffening member being located substantially in the same plane as the plane of movement of the links, a bearing bracket arranged substantially in said plane fixed to the longitudinal frame member to which the links are connected and a helical spring located with its axis substantially vertical with its upper end abutting against the bearing bracket and its lower end against the lower link being freely movable laterally substantially over its entire length and being secured against lateral displacement only at its upper end by the bearing bracket and at its lower end by the lower link.

9. In a power driven vehicle, the combination as set forth in claim 8 in which the upper and lower links are forked, the fork ends being mounted on the frame and the fork ends of the lower link being connected to one another by means of a transverse member, the helical spring bearing at its lower end against the transverse member of the lower link and the upper end of the spring being enclosed by the fork ends of the upper link.

10. In a power driven vehicle, the combination as set forth in claim 8 with a bearing member arranged above the longitudinal frame member for the pivotal mounting of the upper link, said bearing member being rigidly connected to the frame and being integral with the bearing bracket for the helical spring, and a bearing member arranged below the longitudinal frame member and rigidly connected to the frame for the pivotal mounting of the lower link on the frame.

MAX WAGNER.